(12) United States Patent
Paterson et al.

(10) Patent No.: US 11,800,055 B2
(45) Date of Patent: Oct. 24, 2023

(54) ADJUSTABLE MOUNTING SYSTEM FOR A TELEPRESENCE DEVICE

(71) Applicant: Plantronics, Inc., Santa Cruz, CA (US)

(72) Inventors: Nicholas W. Paterson, Aptos, CA (US); Stann N. Sheperd, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 225 days.

(21) Appl. No.: 17/304,977

(22) Filed: Jun. 29, 2021

(65) Prior Publication Data

US 2022/0201243 A1 Jun. 23, 2022

Related U.S. Application Data

(60) Provisional application No. 63/130,285, filed on Dec. 23, 2020.

(51) Int. Cl.
*H04N 7/14* (2006.01)
*G03B 17/56* (2021.01)
*F16M 11/10* (2006.01)

(52) U.S. Cl.
CPC ............ *H04N 7/142* (2013.01); *F16M 11/105* (2013.01); *G03B 17/561* (2013.01)

(58) Field of Classification Search
CPC .. F16M 13/022; F16M 11/105; F16M 11/048; G08B 13/19632; G03B 17/561; H04N 7/142
See application file for complete search history.

(56) References Cited

U.S. PATENT DOCUMENTS

| 812,660 | A | | 2/1906 | Lovegrove | |
|---|---|---|---|---|---|
| 4,074,883 | A | | 2/1978 | Daly | |
| 5,615,854 | A | * | 4/1997 | Nomura | H04N 7/142 |
| | | | | | 248/220.22 |
| 6,991,384 | B1 | * | 1/2006 | Davis | F16M 11/041 |
| | | | | | 396/428 |
| 8,616,789 | B1 | * | 12/2013 | Hutchison | F16M 11/2014 |
| | | | | | 396/428 |
| 9,678,419 | B2 | * | 6/2017 | Fan | F16M 11/2085 |
| 10,012,890 | B2 | * | 7/2018 | Johnson, Sr | F16M 11/10 |
| 10,588,305 | B2 | * | 3/2020 | Larkin | B60R 7/08 |
| 10,725,362 | B2 | * | 7/2020 | Chapman | F16M 11/10 |
| 10,775,683 | B1 | * | 9/2020 | Hallett | F16M 11/24 |
| 10,827,574 | B1 | | 11/2020 | Fu et al. | |
| 10,844,997 | B1 | * | 11/2020 | Loew | F16M 13/00 |
| 11,048,151 | B2 | * | 6/2021 | Ramones | F16M 13/022 |
| 11,531,253 | B1 | * | 12/2022 | Chen | F16M 11/041 |

(Continued)

FOREIGN PATENT DOCUMENTS

GB 2476970 7/2011

OTHER PUBLICATIONS

Extended European Search Report dated Apr. 20, 2022 for related European Patent Application No. 21205010.8.

*Primary Examiner* — Bradley Duckworth
(74) *Attorney, Agent, or Firm* — QUARLES & BRADY LLP

(57) ABSTRACT

An adjustable mounting system enables a telepresence device to be easily mounted to a wall. Once the mounting system is emplaced, the area to which the telepresence device is or will be connected can be adjusted for distance with respect to the wall as well as to ensure the scaffold unit is level—without the need for cumbersome tools.

19 Claims, 11 Drawing Sheets

(56) References Cited

U.S. PATENT DOCUMENTS

| | | | | |
|---|---|---|---|---|
| 2004/0223078 A1* | 11/2004 | Zadok | ................... | F16M 13/04 |
| | | | | 348/375 |
| 2011/0205425 A1* | 8/2011 | Duncan | ................. | F16M 11/32 |
| | | | | 348/373 |
| 2017/0160624 A1* | 6/2017 | Boushell | .............. | G03B 17/561 |
| 2021/0404846 A1* | 12/2021 | Liu | ....................... | G01D 18/00 |

\* cited by examiner

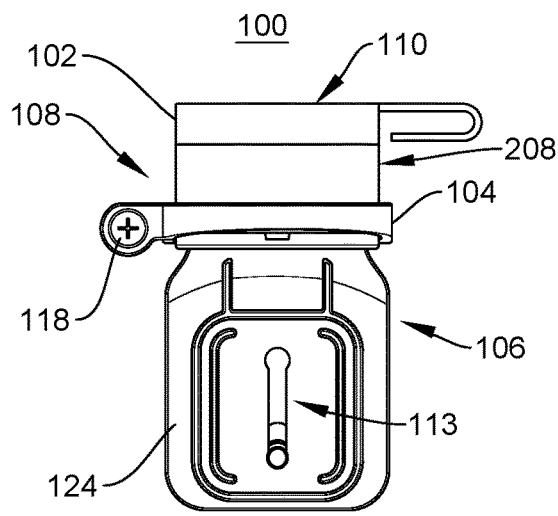
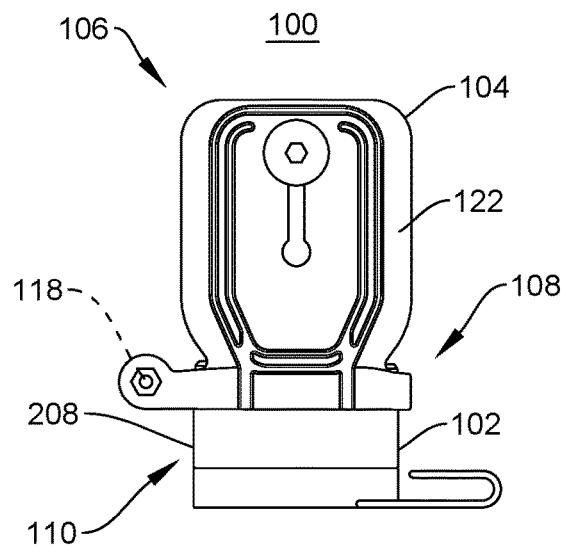
FIG. 5　　　　　FIG. 6
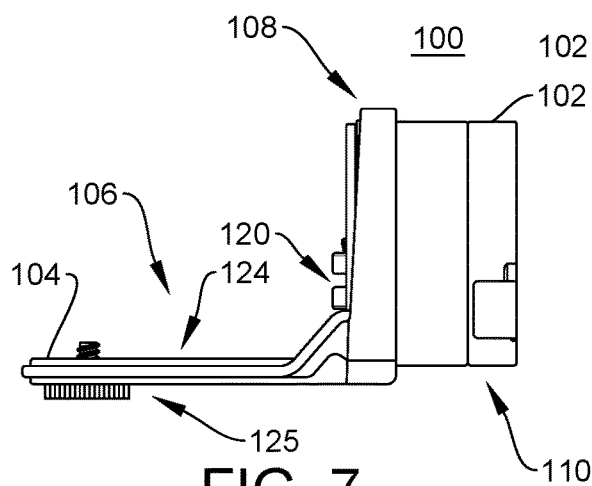
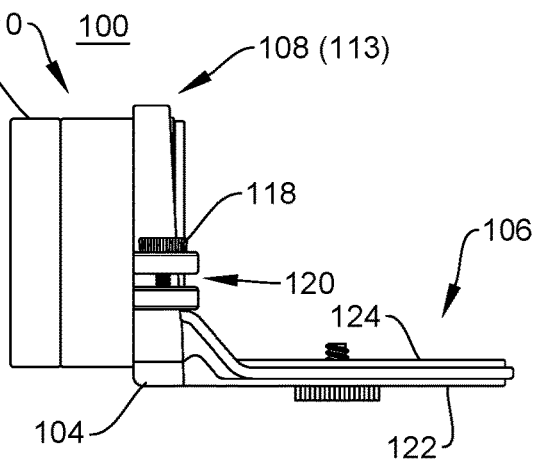
FIG. 7　　　　　FIG. 8
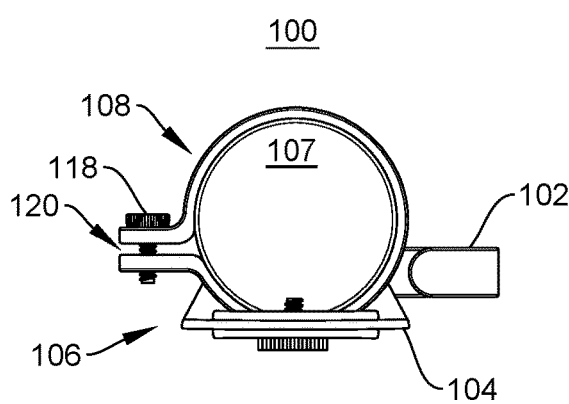
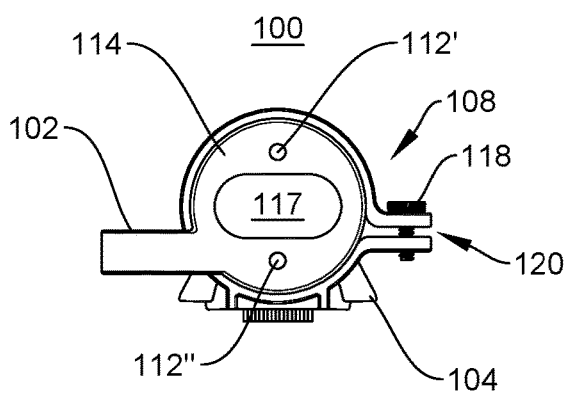
FIG. 9　　　　　FIG. 10

ADJUSTABLE MOUNTING SYSTEM FOR A TELEPRESENCE DEVICE

CROSS-REFERENCE TO RELATED APPLICATION

This application claims priority to U.S. Provisional Application No. 63/130,285, filed Dec. 23, 2020, and entitled ADJUSTABLE MOUNTING SYSTEM FOR A TELEPRESENCE DEVICE, the contents of which are entirely incorporated by reference herein.

TECHNICAL FIELD

This application relates generally to videoconferencing device mounting systems and relates particularly to systems for adjustably mounting a videoconferencing device to a wall or other similar surface.

BACKGROUND

Systems and apparatuses exist for mounting cameras and similar devices to walls and similar surfaces. Such systems and apparatuses tend to be difficult to install, requiring multiple tools and a high degree of precision. Moreover, once they are installed, it is usually extremely challenging for a user to make precise adjustments based on the telepresence device being mounted. Thus, there is room for improvement in the art.

SUMMARY

An adjustable mounting system enables a telepresence device to be easily mounted to a wall. Once the mounting system is emplaced, the area of the mounting system to which the telepresence device will be connected can be adjusted for distance with respect to the wall as well as to ensure the scaffold unit is level—without the need for cumbersome tools.

FIG. 5 is a top plan view of an adjustable mounting system, in accordance with an example of this disclosure.

FIG. 6 is a bottom plan view of an adjustable mounting system, in accordance with an example of this disclosure.

FIG. 7 is a left-side view of an adjustable mounting system, in accordance with an example of this disclosure.

FIG. 8 is a right-side view of an adjustable mounting system, in accordance with an example of this disclosure.

FIG. 9 is a front view of an adjustable mounting system, in accordance with an example of this disclosure.

FIG. 10 is a rear view of an adjustable mounting system, in accordance with an example of this disclosure.

DETAILED DESCRIPTION

Figure 1:
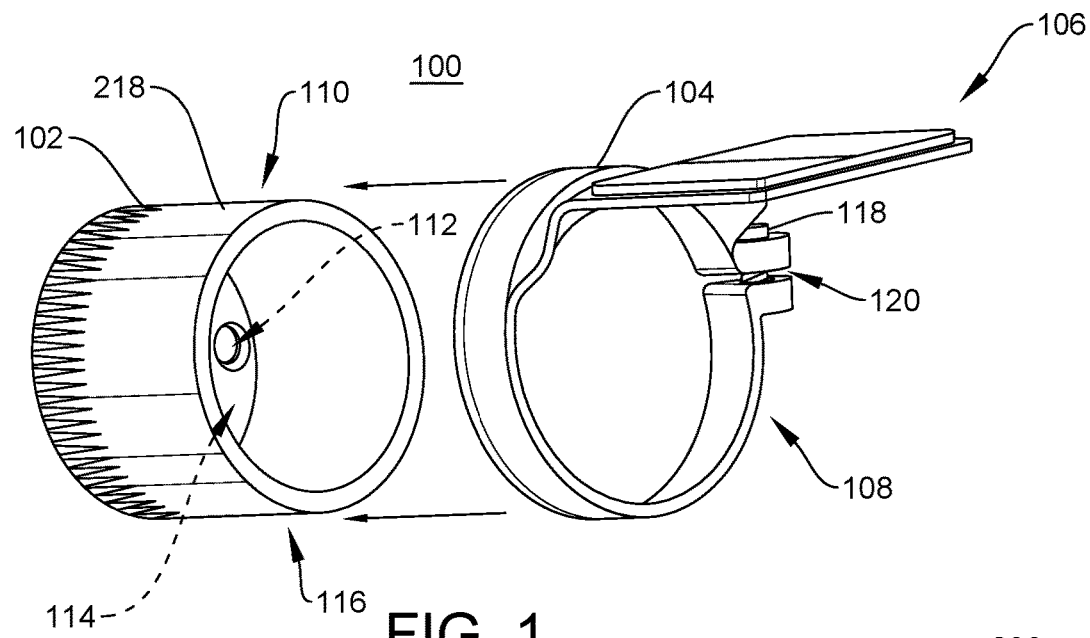
FIG. 1 illustrates an adjustable mounting system for a telepresence device, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

FIG. 1 illustrates an adjustable mounting system 100 for a telepresence device, in accordance with an example of this disclosure. In the example shown in FIG. 1, the system 100 has two primary components: a wall mount 102 and a support component 104. The support component 104 has a scaffold unit 106 connected to a salient-connector portion 108. The scaffold unit 106 can receive a telepresence device such as a camera or the poly studio X30 video Bar™. The salient-connector portion 108 slides onto the salient section 110 of the wall mount 102. The wall mount 102 can be fastened to a wall by fasteners through holes (apertures 112) in the planar face portion 114 of the wall mount 102. The planar face portion 114 is at least partially bounded by walls 218 of the salient section 110. The salient-connector portion 108 can slide along the salient section 110 and around the outer circumference 116 of the salient section 110 before the salient-connector portion 108 is tightened about the salient section 110. An adjustment fastener 118 (e.g., a screw) can be used to shorten and/or close the gap 120 in the salient-connector portion 108 to keep the support component 104 from moving once emplaced.

Figure 2:
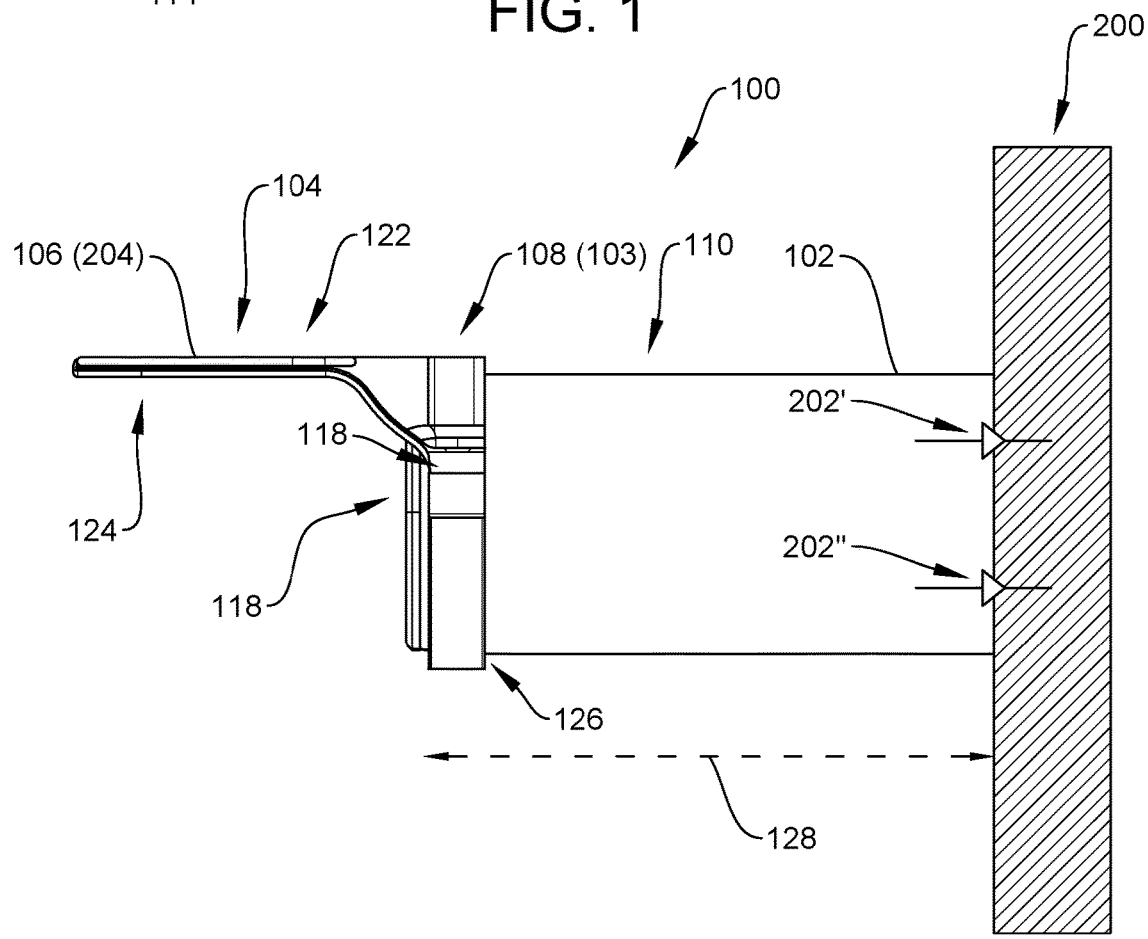
FIG. 2 illustrates the adjustable mounting system of FIG. 1 attached to a wall, in accordance with an example of this disclosure.

FIG. 2 illustrates the adjustable mounting system 100 of FIG. 1 attached to a planar surface, (wall) 200. The salient section 110 of the system 100 is hollow in its interior (see FIG. 1). Fasteners 202 are used to fasten the planar face portion 114 of the system 100 to the wall 200. An adjustment fastener 118 can be used to shorten the gap 120 in the salient-connector portion 108 to keep the salient-connector portion 108 from moving once the scaffold unit 106 of support component 104 is positioned (by a user) as desired.

Depending on the needs of the user, in some examples, a telepresence device can be attached to the top 122 or the bottom 124 of the tongue 204 that forms the scaffold unit 106. It will be noted that although the support component 104 is positioned near a distal end of the salient section 110 in FIG. 2, the support component 104 can be moved along the length 128 of the salient section 110 when the adjustment fastener 118 is loosened. When the adjustment fastener 118 is loosened, as shown in FIG. 1 and FIG. 2, the salient-connector portion 108 can be said to be in an adjustment configuration. The support component 104 is releasably connected to the end 126 of the salient portion 110 of wall mount 102 which is distal from the mounting surface (wall) 200. The salient-connector portion 108 is in a fixed configuration 103 insofar as the scaffold unit 106 is releasably fastened to the salient section 110 because the gap (120) has been closed by the adjustment fastener (118)

Figure 3:
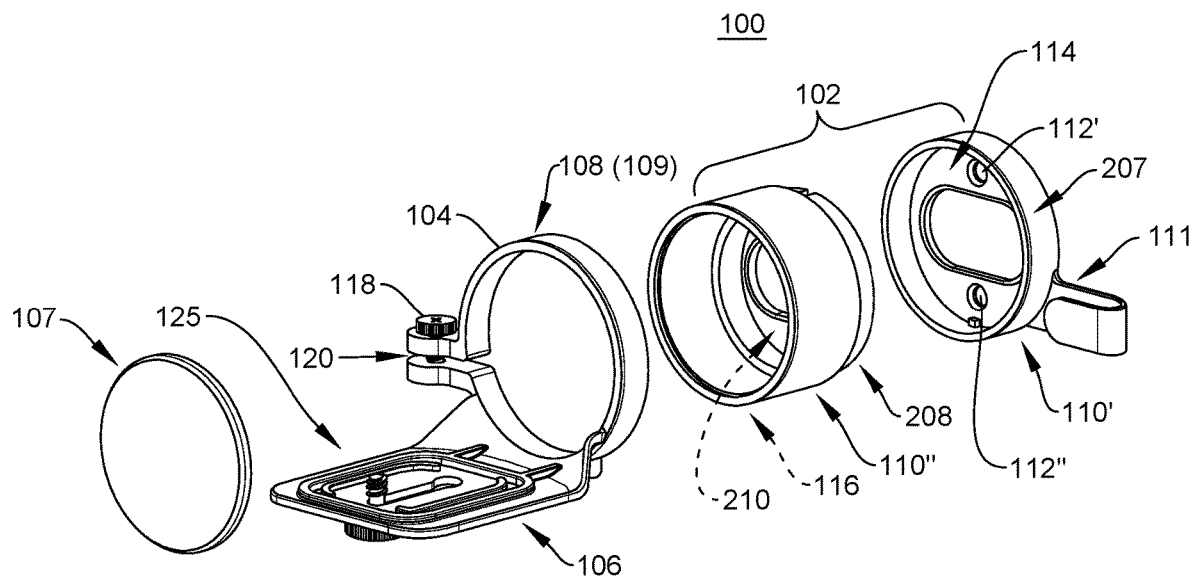
FIG. 3 illustrates an exploded view of an alternate example of an adjustable mounting system, in accordance with an example of this disclosure.

FIG. 3 illustrates an exploded view of an alternate example of an adjustable mounting system 100, in accordance with an example of this disclosure. The wall mount 102 includes a primary (main wall-contacting) element 207 and an extending element 208. The extending element 208 can be attached to the primary element to enable the scaffold unit 106 to be located further away from the mounting surface (e.g., 200). Passing through scaffold unit 106 is a fastening element 125 which can be used to attach a tele-conferencing device to the scaffold unit 106. The salient-connector portion 108 of the support component 104 comprises a flange 109. In FIG. 3, the wall mount 102 includes a cable-receiving element 111 that can be used to support one or more wires connected to a telepresence device. The cable-receiving element 111 can generally be made of some resiliently flexible material such as plastic. A cover 107 fits into the end of the salient section 110 to prevent the fasteners (202) from being visible during normal use of the system 100. The salient section 110 comprises a first section 110' joined to the planar face portion 114 and an extensor section 110" with a second planar face portion 210 having one or more second apertures formed therein. The first section 110' and the extensor section 110" are cylindrical and have matching circumferences 116.

Figure 4:
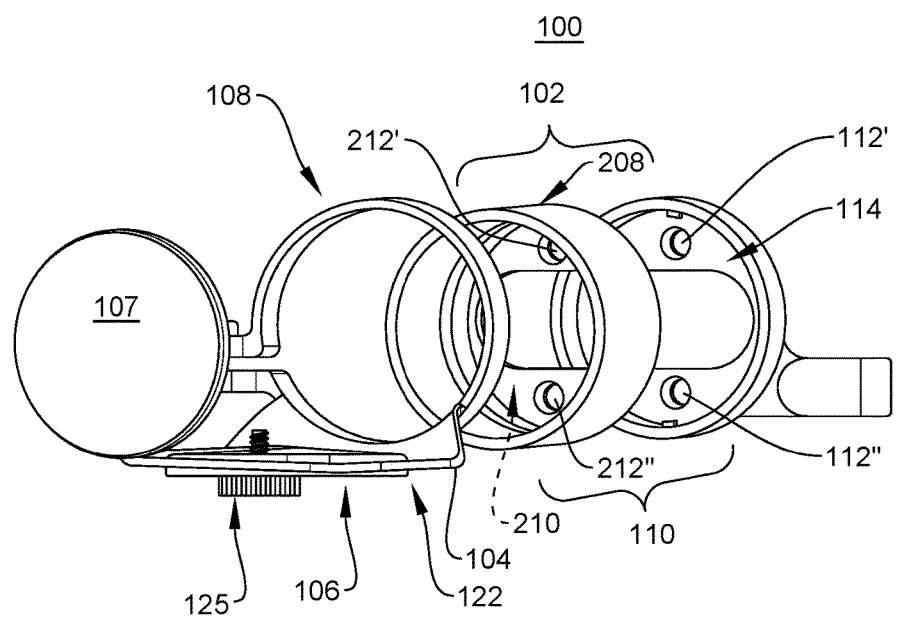
FIG. 4 illustrates another exploded view of an example of an adjustable mounting system, in accordance with an example of this disclosure.

FIG. 4 illustrates another exploded view of an example of an adjustable mounting system 100, in accordance with an example of this disclosure. The system 100 includes a wall mount 102 having a salient section 110, and a planar face portion 114 having one or more apertures 112 formed therein. Each of the one or more apertures 112 are configured to receive a fastener to removably attach the wall mount 102 to a substantially flat surface, such as a wall 200 (see FIG. 2). The wall mount 102 includes a primary (main wall-contacting) element 207 and an extending element 208. The extending element 208 can be attached to the primary element to enable the scaffold unit 106 to be located further away from the mounting surface (e.g., 200). Passing through a scaffold unit 106 is a fastening element 125 which can be used to attach a teleconferencing device to the scaffold unit 106. The salient-connector portion 108 of the support component 104 comprises a flange 109. Cover 107 fits into the end of the salient section 110 to prevent the fasteners (202) from being visible during normal use of the system 100. The salient section 110 comprises a first section 110' joined to the planar face portion 114 and an extensor section 110" with a second planar face portion 210 having one or more second apertures 212 formed therein. At least some of the apertures 212 of extending element 208 are aligned and/or congruent with the apertures 112.

As discussed, the system 100 also includes a support component 104 which is releasably connectable to the salient section 110. Again, the support component 104 includes a scaffold unit 106 which is connected to a salient-connector portion 108. The salient-connector portion 108 is alternately operable in a fixed configuration (see FIG. 2) whereby the scaffold unit 106 is fastened to the salient section 110 of the wall mount 102, and an adjustment configuration (see FIG. 8) whereby the scaffold unit 106 is translatable with respect to a length 128 of the salient section 110 and rotatable about a circumference 116 of the salient section 110.

FIG. 5 is a top plan view of an adjustable mounting system 100, in accordance with an example of this disclosure. The scaffold unit 106 includes an oblong aperture through which one or more fasteners (e.g., 125) can pass to attach a telepresence device to the scaffold unit 106. The salient-connector portion 108 is releasably connected to the extending element 208. The (underside) bottom 124 of the scaffold unit 106 is visible.

FIG. 6 is a bottom plan view of an adjustable mounting system 100, in accordance with an example of this disclosure. As in FIG. 5, the salient-connector portion 108 is releasably connected to the extending element 208. The (outer side) top 122 of the scaffold unit 106 is visible.

FIG. 7 is a left-side view of an adjustable mounting system 100, in accordance with an example of this disclosure. The salient-connector portion 108 releasably connects the scaffold unit 106 to the salient section 110 of the wall mount 102. Passing through scaffold unit 106 is a fastening element 125 which can be used to attach a teleconferencing device to the scaffold unit 106.

FIG. 8 is a right-side view of an adjustable mounting system 100, in accordance with an example of this disclosure. In FIG. 8, the salient-connector portion 108 is in an adjustment configuration 113 insofar as adjustment fastener 118 has not been used to close gap 120. In the adjustment configuration, the scaffold unit 106 is translatable along the length (128) of the salient section 110 and rotatable about a circumference (116) of the salient section 110.

FIG. 9 is a front view of an adjustable mounting system 100, in accordance with an example of this disclosure. Cover 107 fits into the end of the wall mount to prevent fasteners (202) from being visible during normal use of the system 100.

FIG. 10 is a rear view of an adjustable mounting system 100, in accordance with an example of this disclosure. In FIG. 10, apertures 112 in the planar face portion 114 of the wall mount 102 are clearly visible. Also visible is an additional opening 117 in the planar face portion 114.

Figure 11:
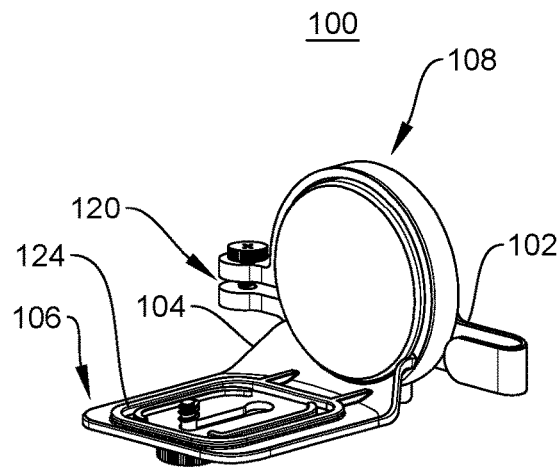
FIG. 11 is a perspective view of an adjustable mounting system, in accordance with an example of this disclosure.

FIG. 11 is a perspective view of an adjustable mounting system 100, in accordance with an example of this disclosure. The (underside) bottom 124 of the scaffold unit 106 is oriented to receive a telepresence device or other equipment.

Figure 12:
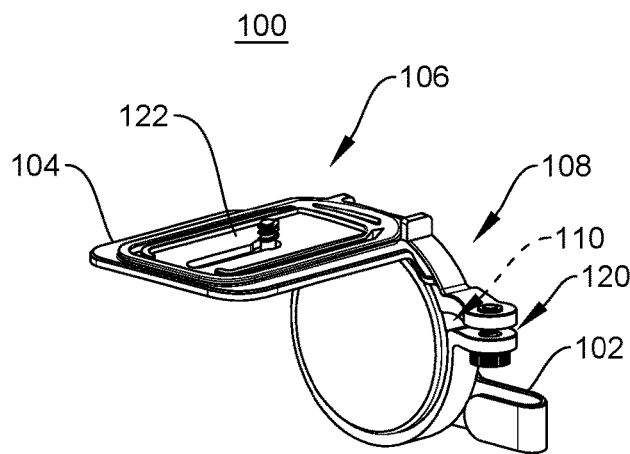
FIG. 12 is a perspective view of an adjustable mounting system, in accordance with an example of this disclosure.

FIG. 12 is a perspective view of an adjustable mounting system, in accordance with an example of this disclosure. The (outer side) top 122 of the scaffold unit 106 is oriented to receive a telepresence device or other equipment.

Figure 13:
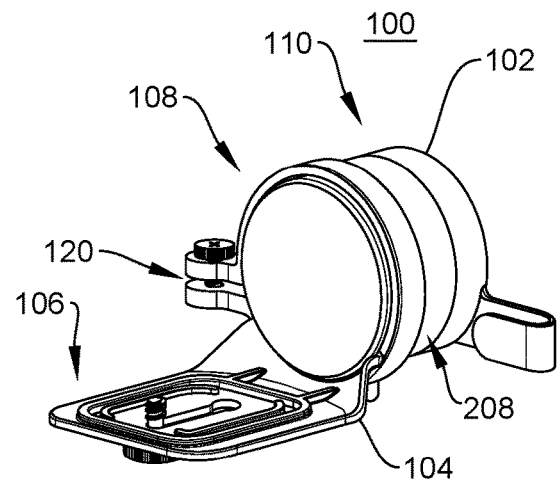
FIG. 13 is a perspective view of an adjustable mounting system, in accordance with an example of this disclosure.

FIG. 13 is a perspective view of an adjustable mounting system, in accordance with an example of this disclosure. As in FIG. 11, the (underside) bottom 124 of the scaffold unit 106 is oriented to receive a telepresence device or other equipment.

Figure 14:
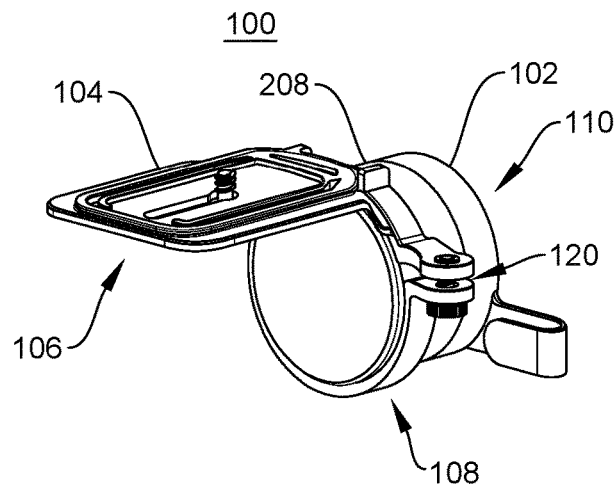
FIG. 14 is a perspective view of an adjustable mounting system, in accordance with an example of this disclosure.

FIG. 14 is a perspective view of an adjustable mounting system, in accordance with an example of this disclosure. As in FIG. 12, the (outer side) top 122 of the scaffold unit 106 is oriented to receive a telepresence device or other equipment.

Figure 15:
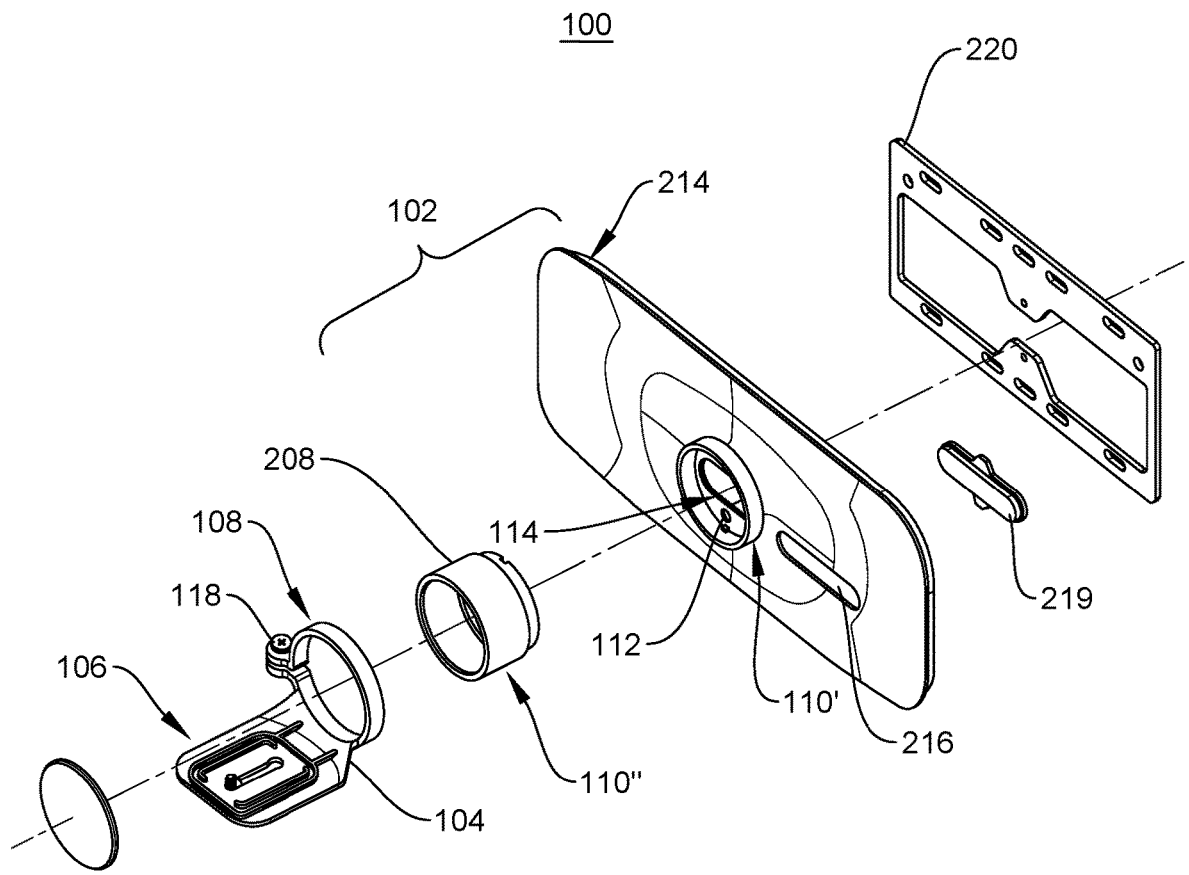
FIG. 15 is an exploded view of an adjustable mounting system, in accordance with an example of this disclosure.

FIG. 15 is an exploded view of an adjustable mounting system 100, in accordance with an example of this disclosure. In FIG. 15, the wall mount 102 includes a platen portion 214 connected to the salient section 110 and the planar face portion 114. The salient section 110 is orthogonal to the planar face portion 114 and the platen portion 214. The platen portion 214 has a cable port 216 formed therein. The cable port 216 is configured to receive a removable cable port cover 219. The adjustable mounting system 100 also includes a wall plate 220 which can be attached to a wall. Fasteners (202) can then be used to fasten the wall mount 102 to the wall plate 220.

Figure 16:
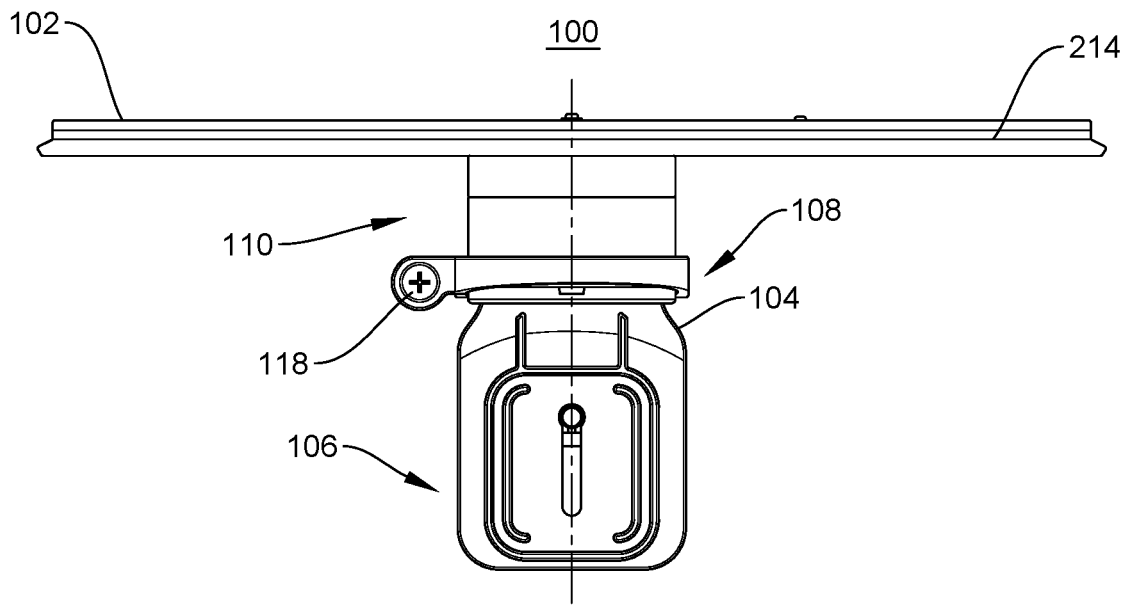
FIG. 16 is a top plan view of an adjustable mounting system, in accordance with an example of this disclosure.

FIG. 16 is a top plan view of the assembled adjustable mounting system 100 of FIG. 15, in accordance with an example of this disclosure. The scaffold unit 106 is oriented to receive a teleconferencing device or other electronic device.

Figure 17:
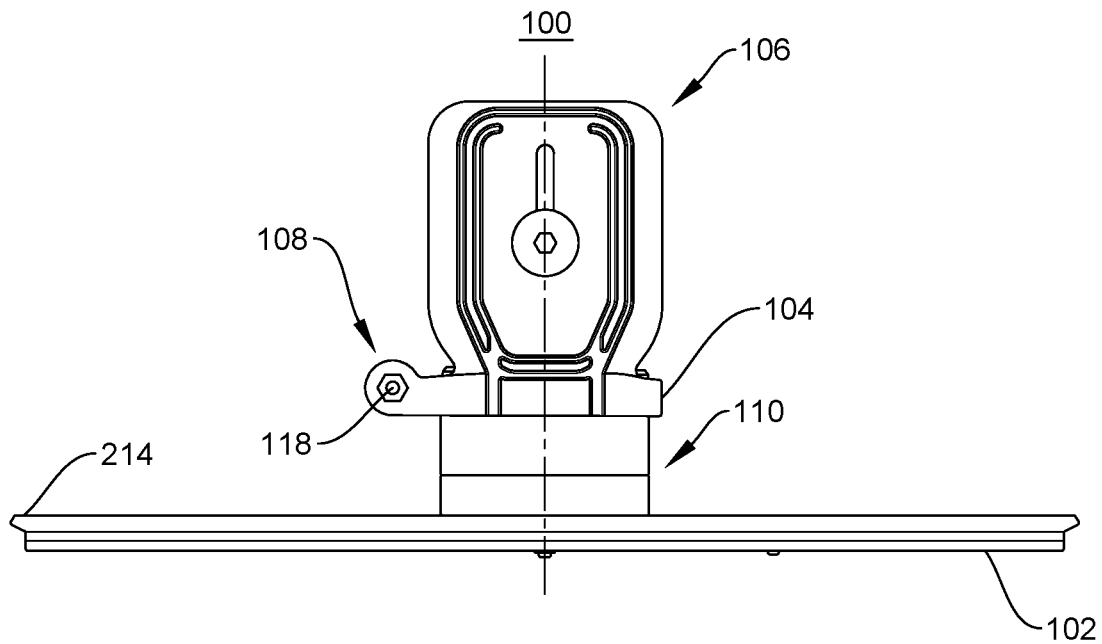
FIG. 17 is a bottom plan view of an adjustable mounting system, in accordance with an example of this disclosure.

FIG. 17 is a bottom plan view of the assembled adjustable mounting system 100 of FIG. 15, in accordance with an example of this disclosure.

Figure 18:
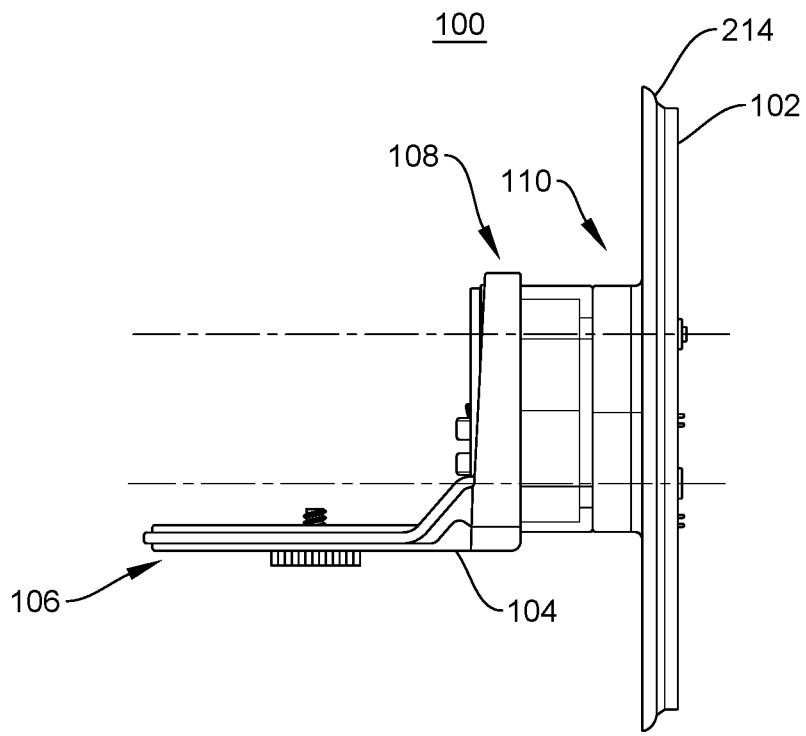
FIG. 18 is a left-side view of an adjustable mounting system, in accordance with an example of this disclosure.

FIG. 18 is a left-side view of the assembled adjustable mounting system 100 of FIG. 15, in accordance with an example of this disclosure.

Figure 19:
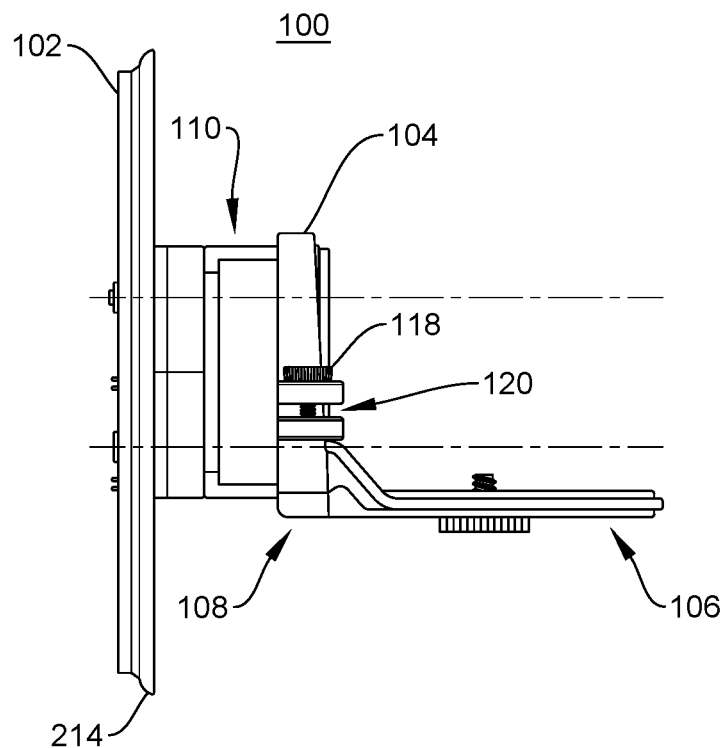
FIG. 19 is a right-side view of an adjustable mounting system, in accordance with an example of this disclosure.

FIG. 19 is a right-side view of the assembled adjustable mounting system 100 of FIG. 15, in accordance with an example of this disclosure.

Figure 20:
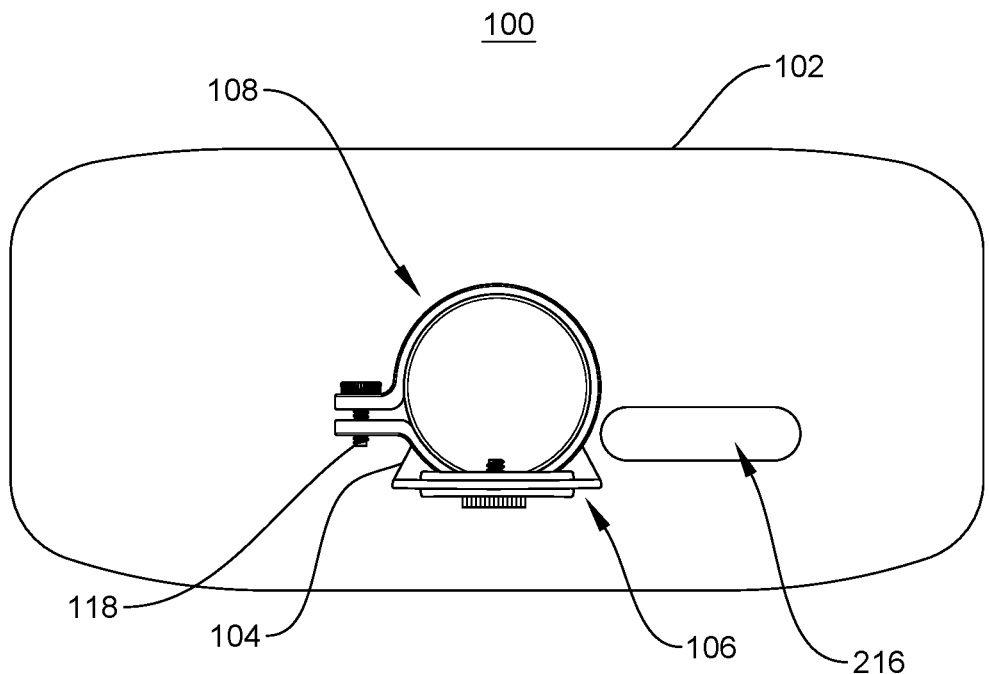
FIG. 20 is a front view of an adjustable mounting system, in accordance with an example of this disclosure.

FIG. 20 is a front view of the assembled adjustable mounting system 100 of FIG. 15, in accordance with an example of this disclosure.

Figure 21:
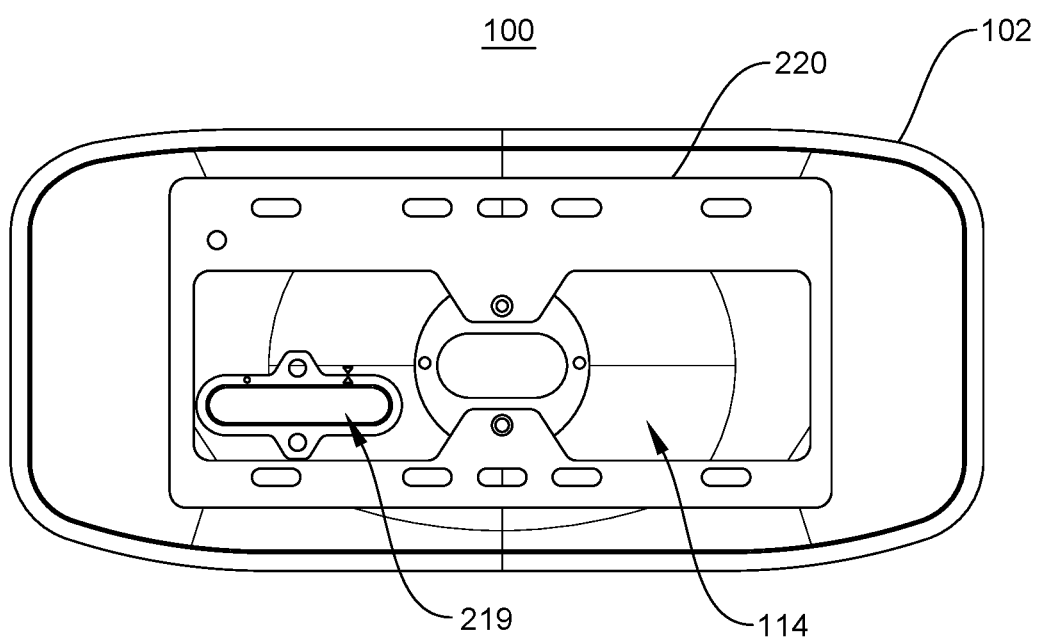
FIG. 21 is a rear view of an adjustable mounting system, in accordance with an example of this disclosure.

FIG. 21 is a rear view of the assembled adjustable mounting system 100 of FIG. 15, in accordance with an example of this disclosure. Cable port cover 219 is emplaced.

Figure 22:
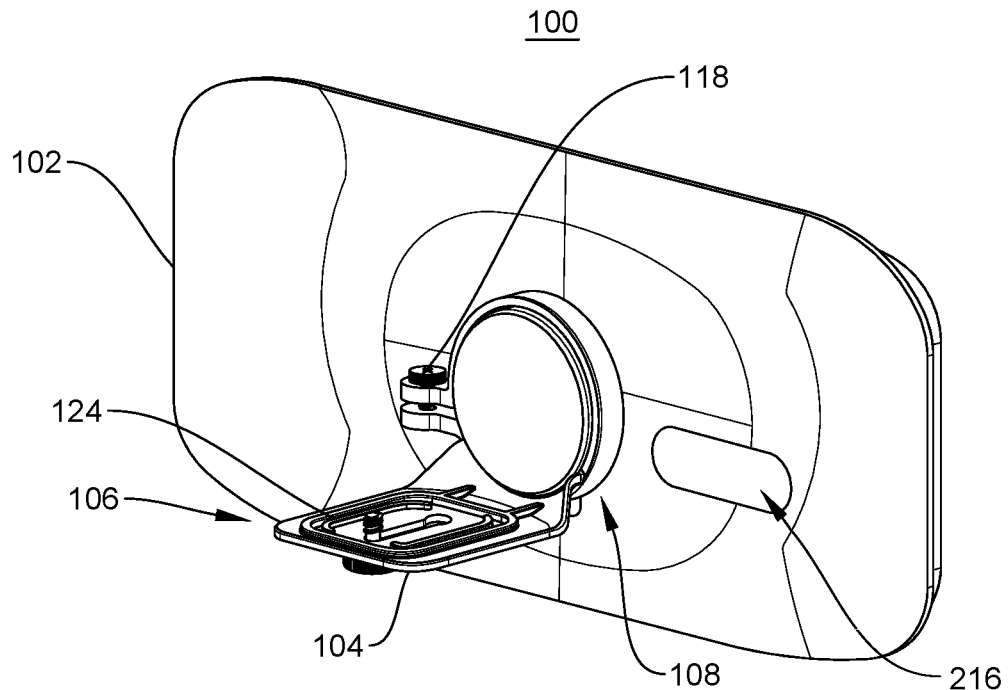
FIG. 22 is a perspective view of an adjustable mounting system, in accordance with an example of this disclosure.

FIG. 22 is a perspective view of an adjustable mounting system 100 of the assembled adjustable mounting system 100 of FIG. 15, in accordance with an example of this disclosure. The scaffold unit 106 is oriented to receive a device on (inner side) bottom 124.

Figure 23:
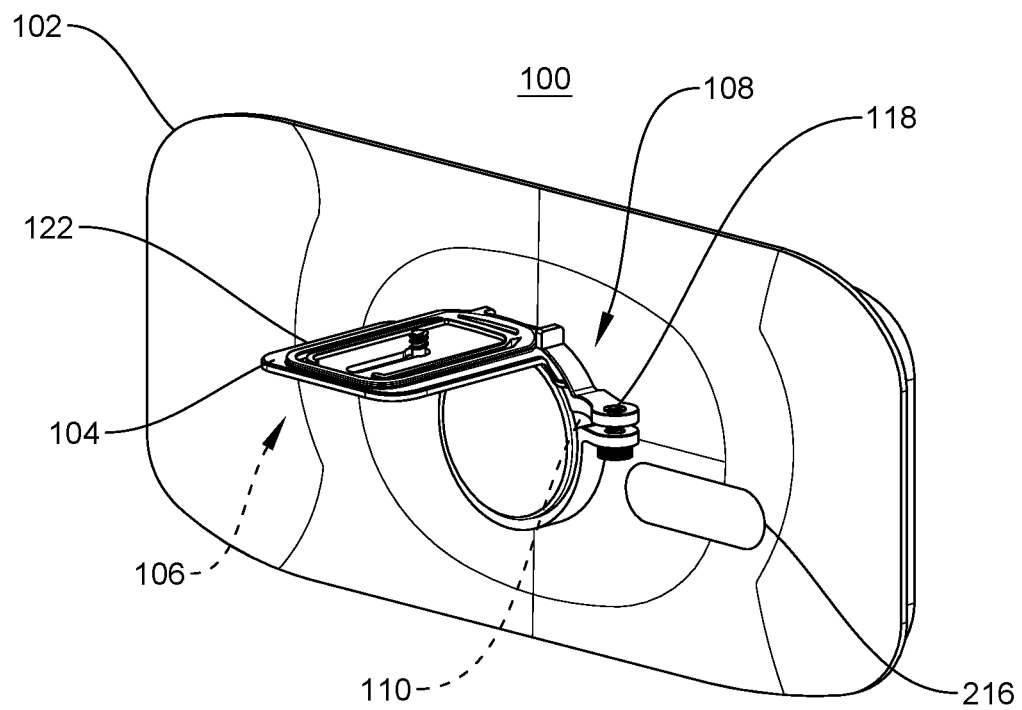
FIG. 23 is a perspective view of an adjustable mounting system, in accordance with an example of this disclosure.

FIG. 23 is a perspective view of an adjustable mounting system 100 of the assembled adjustable mounting system 100 of FIG. 15, in accordance with an example of this disclosure. The support unit 104 has been rotated 180 degrees relative to the support unit's position in FIG. 22. The scaffold unit 106 is therefore oriented to receive a device on (outer side) top 122.

Figure 24:
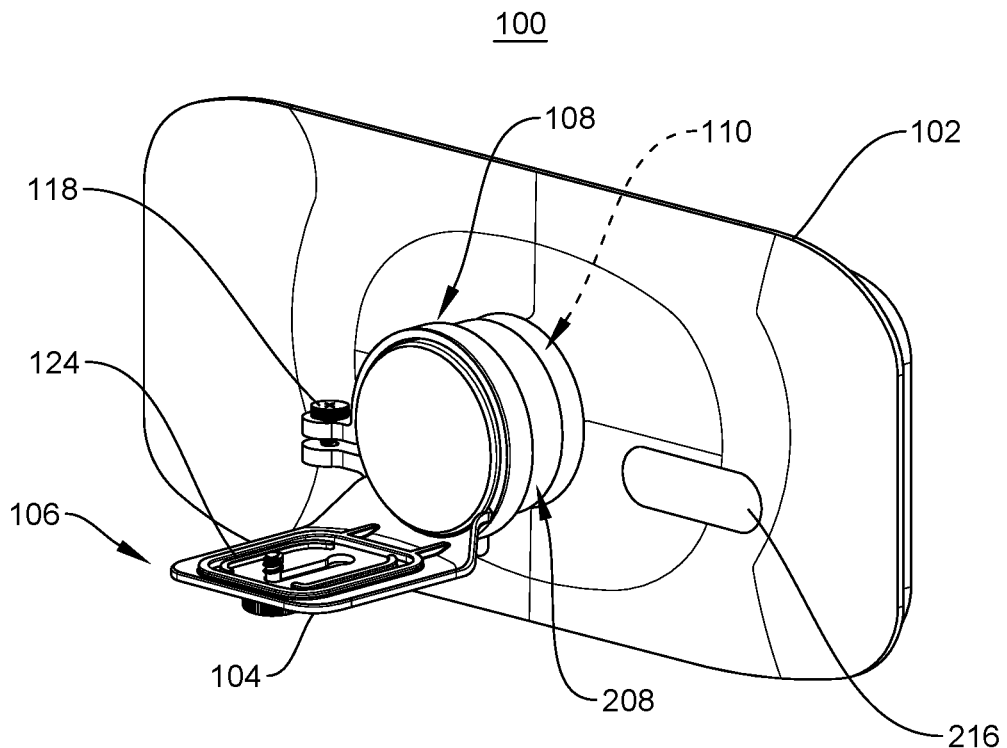
FIG. 24 is a perspective view of an adjustable mounting system, in accordance with an example of this disclosure.

FIG. 24 is a perspective view of an adjustable mounting system 100 of the assembled adjustable mounting system 100 of FIG. 15, in accordance with an example of this disclosure. The system 100 in FIG. 24 differs from that in FIG. 22 in that in FIG. 24 the extending element 208 is present. As in FIG. 22, the scaffold unit 106 is oriented to receive a device on (inner side) bottom 124.

Figure 25:
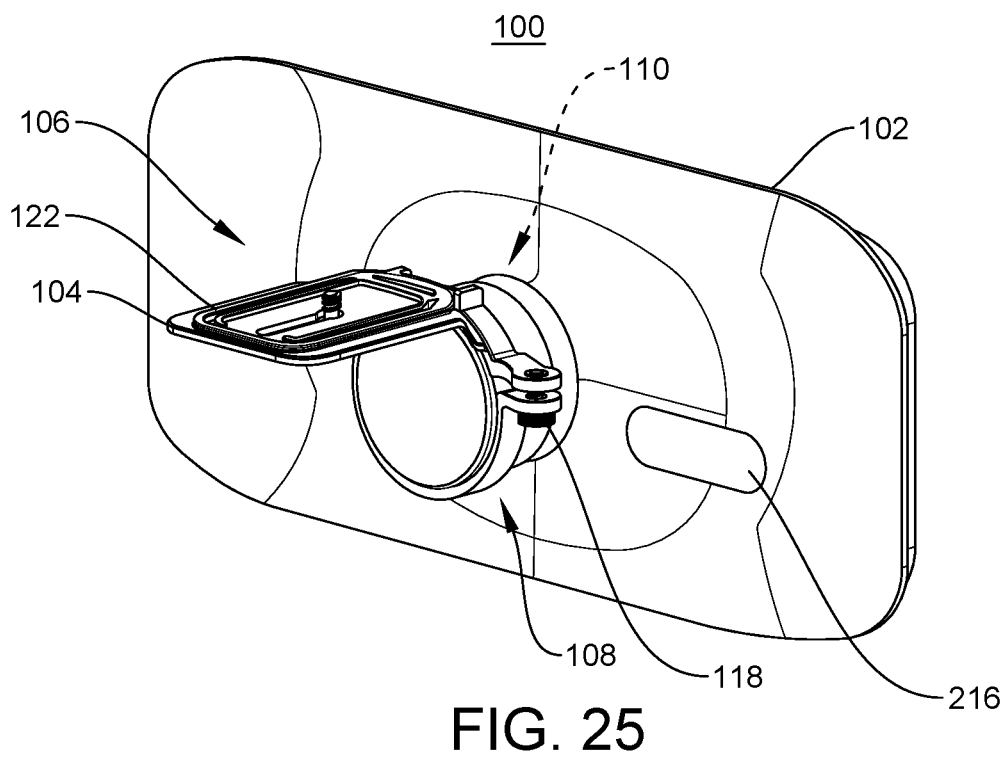
FIG. 25 is a perspective view of an adjustable mounting system, in accordance with an example of this disclosure.

FIG. 25 is a perspective view of an adjustable mounting system 100, in accordance with an example of this disclosure. The system 100 in FIG. 25 differs from that in FIG. 23 in that in FIG. 25 the extending element 208 is present. As in FIG. 23, the support unit 104 has been rotated 180 degrees relative to the support unit's position in FIG. 24. The scaffold unit 106 is therefore oriented to receive a device on (outer side) top 122.

Figure 26:
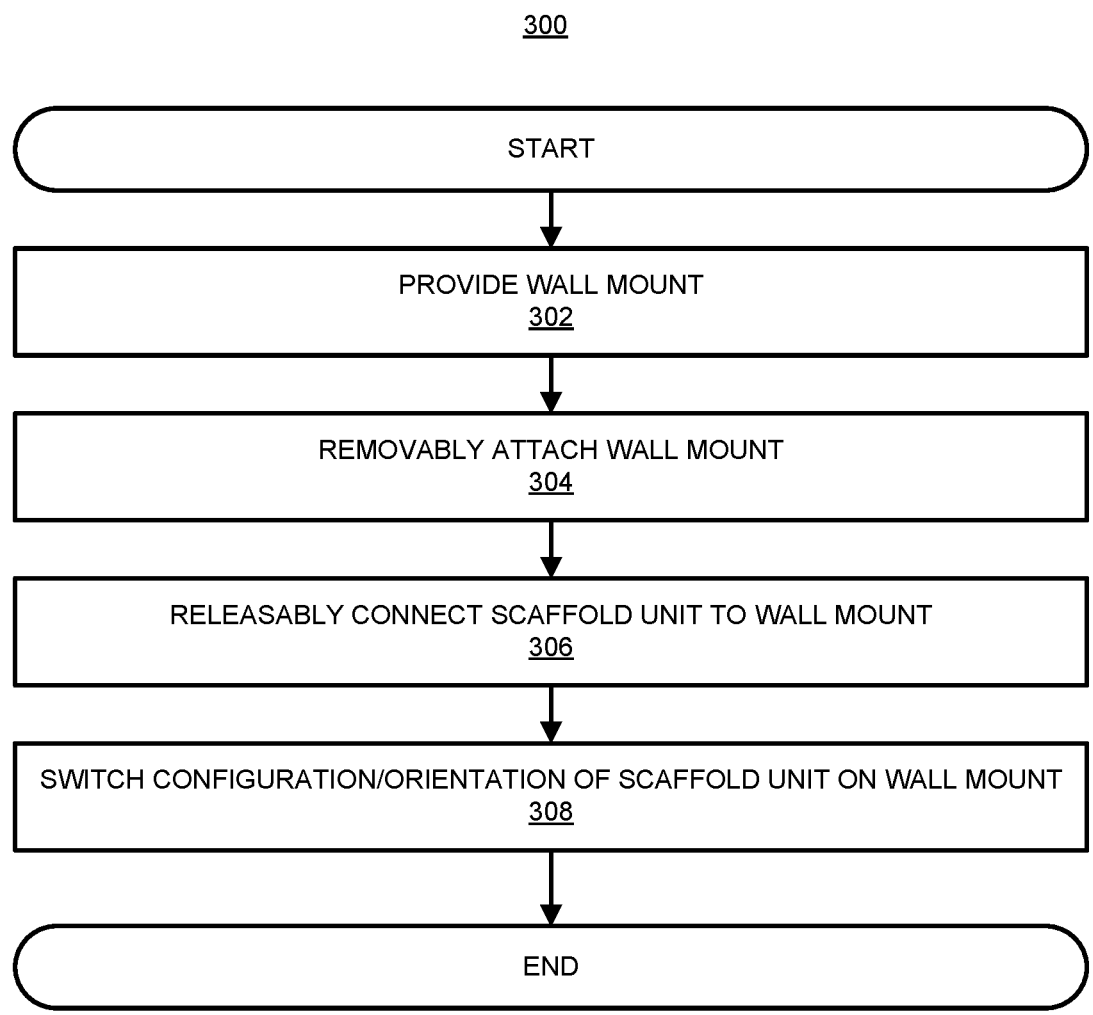
FIG. 26 illustrates a method for deploying an adjustable mounting system, in accordance with an example of this disclosure.

FIG. 26 illustrates a method 300 for deploying an adjustable mounting system 100, in accordance with an example of this disclosure. The method 300 includes providing 302 a wall mount 102 comprising a salient section 110 connected to a first planar face portion having one or more first apertures 112 formed therein, each of the one or more first apertures 112 configured to receive a fastener 202. After providing 302 the wall mount, the method 300 includes removably attaching 304 the wall mount 102 to a planar surface 200 by driving a faster through each of the one or more first apertures 112 into a load-bearing material posterior to the planar surface 200, and then releasably connecting 306 a salient-connector portion 108 of a support device 104 to the salient section 110, the support device 104 having a scaffold unit 106 joined to the salient-connector portion 108. Thereafter, the method 300 includes switching 308 the salient-connector portion 108 from a fixed configuration (103) in which the scaffold unit 106 is fastened to the salient section 110 of the wall mount 102 to an adjustment configuration (113) in which the scaffold unit 106 is rotatable about a circumference 116 of the salient section 110 and translatable along a length 128 of the salient section 110.

Examples of this disclosure include:

1. An adjustable mounting system 100, comprising: a wall mount 102 comprising a salient section 110 connected to a planar face portion 114 having one or more first apertures 112 formed therein, each of the one or more first apertures 112 configured to receive a fastener 202 to removably attach the wall mount 102 to a planar surface 200; and a support component 104 including a scaffold unit 106 and a salient-connector portion 108 joined thereto, the salient-connector portion 108 releasably connecting the support component 104 to the salient section 110, wherein the salient-connector portion 108 is alternately operable in a fixed configuration (103) in which the scaffold unit 106 is releasably fastened to the salient section 110 and an adjustment configuration (113) in which the scaffold unit 106 is translatable along a length 128 of the salient section 110.

2. The adjustable mounting system 100 of example 1, wherein the salient-connector portion 108 is further alternately operable in the fixed configuration (103) in which the scaffold unit 106 is fastened to the salient section 110 of the wall mount 102 and the adjustment configuration (113) in which the scaffold unit 106 is translatable along the length 128 of the salient section 110 and rotatable about a circumference 116 of the salient section 110.

3. The adjustable mounting system 100 of example 1, wherein the salient-connector portion 108 comprises a flange 109.

4. The adjustable mounting system 100 of example 3, wherein the flange 109 includes a tightness-adjusting element operable to adjust a tightness of the flange 109 around the salient section 110.

5. The adjustable mounting system 100 of example 1, wherein the salient section 110 comprises a first section 110' joined to the planar face portion 114 and an extensor section 110" with a second planar face portion 210 having one or more second apertures 212 formed therein, wherein at least one of the one or more second apertures 212 are congruent with at least one of the one or more first apertures 112.

6. The adjustable mounting system 100 of example 5, wherein the first section 110' and the extensor section 110" are cylindrical and have matching circumferences 116.

7. The adjustable mounting system 100 of example 1, the wall mount 102 further comprising a platen portion (214) connected to the salient section 110 and the planar face portion 114, wherein the salient section 110 is orthogonal to the planar face portion 114 and the platen portion (214).

8. The adjustable mounting system 100 of example 7, wherein the platen portion (214) has at least one cable port formed therein.

9. The adjustable mounting system 100 of example 8, wherein the cable port is configured to receive a removable cable port cover.

10. The adjustable mounting system 100 of example 1, wherein the planar face portion 114 is at least partially bounded by walls 218 of the salient section 110.

11. The adjustable mounting system 100 of example 1, wherein the planar surface 200 is formed by a metallic wall plate.

12. The adjustable mounting system 100 of example 1, wherein the scaffold unit 106 comprises a first receiving area 122 operable to receive a supported device in a first configuration and a second receiving area 124 operable to receive the supported device in a second configuration in which the salient-connector portion 108 is rotated from first configuration one hundred and eighty degrees about the salient portion.

13. The adjustable mounting system 100 of example 1, wherein the fastener 202 comprises a bolt, screw, or nail.

14. A method 300 for deploying an adjustable mounting system 100, comprising: providing 302 a wall mount 102 comprising a salient section 110 connected to a first planar face portion having one or more first apertures 112 formed therein, each of the one or more first apertures 112 configured to receive a fastener 202; removably attaching 304 the wall mount 102 to a planar surface 200 by driving a faster through each of the one or more first apertures 112 into a load-bearing material posterior to the planar surface 200; releasably connecting 306 a salient-connector portion 108 of a support device 110 to the salient section 110, the support device 110 having a scaffold unit 106 joined to the salient-connector portion 108; and switching 308 the salient-connector portion 108 from a fixed configuration (103) in which the scaffold unit 106 is fastened to the salient section 110 of the wall mount 102 to an adjustment configuration (113) in which the scaffold unit 106 is rotatable about a circumference 116 of the salient section 110 and translatable along a length 128 of the salient section 110.

15. The method for deploying the adjustable mounting system 100 of example 14, wherein the salient-connector portion 108 comprises a flange 109.

16. The method for deploying the adjustable mounting system 100 of example 15, further comprising adjusting a tightness of the flange 109 around the salient section 110.

17. The method for deploying the adjustable mounting system 100 of example 14, wherein removably attaching the wall mount 102 to the planar surface 200 by driving the fastener 202 through each of the one or more first apertures 112 into the load-bearing material posterior to the planar surface 200 comprises releasably attaching an extensor section to the load-bearing material by driving the fastener 202 through each of one or more second apertures of a second planar face portion of the extensor section congruent with the one or more first apertures 112 of the first planar face portion 114.

18. The method for deploying the adjustable mounting system 100 of example 14, wherein providing the wall mount 102 further comprises providing the wall mount 102 with a platen portion (214) connected to the salient section 110 and the first planar face portion 114, the salient section 110 orthogonal to the first planar face portion 114 and the platen portion (214).

19. The method for deploying the adjustable mounting system 100 example 18, wherein providing the wall mount 102 with the platen portion (214) comprises forming at least one cable port in the platen portion (214).

20. The method for deploying the adjustable mounting system 100 of example 14, further comprising rotating the salient-connector portion 108 from a first position in which a first receiving area of the scaffold unit 106 is operable to receive a supported device in a first configuration one hundred and eighty degrees about the salient portion to a second position in which a second receiving area of the scaffold unit 106 is operable to receive the supported device in a second configuration.

The various examples within this disclosure are provided by way of illustration and should not be construed to limit the scope of the disclosure. Various modifications and changes can be made to the principles and examples described herein without departing from the scope of the disclosure and without departing from the claims which follow.

It is claimed:

1. An adjustable mounting system, comprising:
   a wall mount comprising a salient section connected to a planar face portion having one or more first apertures formed therein, each of the one or more first apertures configured to receive a fastener to removably attach the wall mount to a planar surface; and
   a support component including a scaffold unit and a salient-connector portion joined thereto, the salient-connector portion releasably connecting the support component to the salient section,
   wherein the salient-connector portion is alternately operable in a fixed configuration in which the scaffold unit is releasably fastened to the salient section and an adjustment configuration in which the scaffold unit is translatable along a length of the salient section; and
   wherein the salient section includes a first section joined to the planar face portion and an extensor section with a second planar face portion.

2. The adjustable mounting system of claim 1, wherein the salient-connector portion is further alternately operable in the fixed configuration in which the scaffold unit is fastened to the salient section of the wall mount and the adjustment configuration in which the scaffold unit is translatable along the length of the salient section and rotatable about a circumference of the salient section.

3. The adjustable mounting system of claim 1, wherein the salient-connector portion comprises a flange.

4. The adjustable mounting system of claim 3, wherein the flange includes a tightness-adjusting element operable to adjust a tightness of the flange around the salient section.

5. The adjustable mounting system of claim 1, wherein the second planar face portion includes one or more second apertures formed therein, and wherein at least one of the one or more second apertures are congruent with at least one of the one or more first apertures.

6. The adjustable mounting system of claim 1, wherein the salient section and the extensor section are cylindrical and have matching circumferences.

7. The adjustable mounting system of claim 1, the wall mount further comprising a platen portion connected to the salient section and the planar face portion, wherein the salient section is orthogonal to the planar face portion and the platen portion.

8. The adjustable mounting system of claim 7, wherein the platen portion has at least one cable port formed therein.

9. The adjustable mounting system of claim 8, wherein the cable port is configured to receive a removable cable port cover.

10. The adjustable mounting system of claim 1, wherein the planar face portion is at least partially bounded by walls of the salient section.

11. The adjustable mounting system of claim 1, wherein the planar surface is formed by a metallic wall plate.

12. The adjustable mounting system of claim 1, wherein the scaffold unit comprises a first receiving area operable to receive a supported device in a first configuration and a second receiving area operable to receive the supported device in a second configuration in which the salient-connector portion is rotated from the first configuration one hundred and eighty degrees about the salient portion.

13. The adjustable mounting system of claim 1, wherein the fastener comprises a bolt, screw, or nail.

14. A method for deploying an adjustable mounting system, comprising:
providing a wall mount comprising a salient section connected to a first planar face portion having one or more first apertures formed therein, each of the one or more first apertures configured to receive a fastener;
removably attaching the wall mount to a planar surface by driving a fastener through each of the one or more first apertures into a load-bearing material posterior to the planar surface;
releasably attaching an extensor section to the load-bearing material by driving the fastener through each of one or more second apertures of a second planar face portion of the extensor section congruent with the one or more first apertures of the first planar face portion;
releasably connecting a salient-connector portion of a support device to the salient section, the support device having a scaffold unit joined to the salient-connector portion; and
switching the salient-connector portion from a fixed configuration in which the scaffold unit is fastened to the salient section of the wall mount to an adjustment configuration in which the scaffold unit is rotatable about a circumference of the salient section and translatable along a length of the salient section.

15. The method for deploying the adjustable mounting system of claim 14, wherein the salient-connector portion comprises a flange.

16. The method for deploying the adjustable mounting system of claim 15, further comprising adjusting a tightness of the flange around the salient section.

17. The method for deploying the adjustable mounting system of claim 14, wherein providing the wall mount further comprises providing the wall mount with a platen portion connected to the salient section and the first planar face portion, the salient section orthogonal to the first planar face portion and the platen portion.

18. The method for deploying the adjustable mounting system claim 17, wherein providing the wall mount with the platen portion comprises forming at least one cable port in the platen portion.

19. The method for deploying the adjustable mounting system of claim 14, further comprising rotating the salient-connector portion from a first position in which a first receiving area of the scaffold unit is operable to receive a supported device in a first configuration one hundred and eighty degrees about the salient portion to a second position in which a second receiving area of the scaffold unit is operable to receive the supported device in a second configuration.

* * * * *